(12) United States Patent
Alsahnawi et al.

(10) Patent No.: US 12,380,438 B2
(45) Date of Patent: Aug. 5, 2025

(54) SYSTEMS AND METHODS FOR VERIFYING CRYPTOGRAPHICALLY SECURED COMMUNICATIONS BETWEEN USERS USING NON-TRANSFERABLE TOKENS

(71) Applicant: Capital One Services, LLC, McLean, VA (US)

(72) Inventors: Hazar Alsahnawi, McLean, VA (US); Michael Mossoba, Great Falls, VA (US); Austin Erickson, Herndon, VA (US); Shannon Yogerst, New York, NY (US); Dan Lin, Arlington, VA (US); John E. Jones, IV, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 226 days.

(21) Appl. No.: 18/176,405

(22) Filed: Feb. 28, 2023

(65) Prior Publication Data
US 2024/0289783 A1    Aug. 29, 2024

(51) Int. Cl.
*G06Q 20/38* (2012.01)
*G06Q 20/40* (2012.01)

(52) U.S. Cl.
CPC ..... *G06Q 20/38215* (2013.01); *G06Q 20/401* (2013.01); *G06Q 2220/00* (2013.01)

(58) Field of Classification Search
None
See application file for complete search history.

(56) References Cited

U.S. PATENT DOCUMENTS

| 11,308,487 | B1 * | 4/2022 | Foster | G06Q 20/3829 |
| 11,501,297 | B1 * | 11/2022 | Tai | G06Q 20/20 |
| 11,757,640 | B2 * | 9/2023 | Ferenczi | H04L 9/3247 |
| | | | | 713/172 |
| 2011/0137801 | A1 * | 6/2011 | Hutchison | G06Q 20/40 |
| | | | | 705/50 |

(Continued)

FOREIGN PATENT DOCUMENTS

WO    WO-2024053791 A1 *    3/2024    ........... G06Q 10/101

OTHER PUBLICATIONS

M. Eltuhami, M. Abdullah and B. A. Talip, "Identity Verification and Document Traceability in Digital Identity Systems using Non-Transferable Non-Fungible Tokens," 2022 International Visualization, Informatics and technology Conference (IVIT), Kuala Lampur, Malaysia, 2022 (Year: 2022).*

(Continued)

*Primary Examiner* — Neha Patel
*Assistant Examiner* — Jahed Ali
(74) *Attorney, Agent, or Firm* — Foley & Lardner LLP

(57) ABSTRACT

Systems and methods for verifying digitally secured communications between users are disclosed herein. A first user identifier for a first user may be received. A first blockchain address for the first user based on the first user identifier may be determined. A first non-transferable token corresponding to the first user may be generated. A request for a communication may be received. A target address and a target user identifier may be extracted. Whether the communication metadata matches the token metadata may be determined. A validation status for the communication may be determined.

20 Claims, 6 Drawing Sheets

(56) References Cited

U.S. PATENT DOCUMENTS

| | | | |
|---|---|---|---|
| 2014/0279096 A1* | 9/2014 | Akin | G06Q 20/405 705/16 |
| 2016/0232518 A1* | 8/2016 | Butler, IV | G06Q 20/209 |
| 2019/0272522 A1* | 9/2019 | Silverman | G06Q 40/02 |
| 2019/0372769 A1* | 12/2019 | Fisher | G06K 7/1417 |
| 2020/0119904 A1* | 4/2020 | Philyaw | H04L 63/105 |
| 2022/0058633 A1* | 2/2022 | Yantis | G06Q 20/4016 |
| 2022/0210061 A1* | 6/2022 | Simu | H04L 9/3239 |
| 2023/0034169 A1* | 2/2023 | Ferenczi | H04L 63/0823 |
| 2023/0061294 A1* | 3/2023 | Banga | G06Q 20/4016 |
| 2023/0062776 A1* | 3/2023 | Vosseller | G06Q 30/018 |
| 2023/0092012 A1* | 3/2023 | Matthews | G06Q 20/0658 |
| 2023/0104103 A1* | 4/2023 | Eby | G06Q 20/3678 705/69 |
| 2023/0108366 A1* | 4/2023 | Tang | G06Q 20/3672 705/66 |
| 2023/0237471 A1* | 7/2023 | Siedleczka | G06Q 20/389 705/75 |
| 2023/0274283 A1* | 8/2023 | Kryvoshei | G06Q 20/123 |
| 2023/0298001 A1* | 9/2023 | Jethmalani | G06Q 20/36 705/65 |
| 2023/0409610 A1* | 12/2023 | Gratzer | G06F 16/211 |
| 2023/0421399 A1* | 12/2023 | Quirk | H04L 9/3239 |
| 2024/0211910 A1* | 6/2024 | Lal | G06Q 40/04 |
| 2024/0232858 A1* | 7/2024 | Tax | G06Q 20/3829 |
| 2024/0261692 A1* | 8/2024 | Sliwka | H04L 9/3213 |

OTHER PUBLICATIONS

Joel Frank, "What Are Soulbound Tokens (SBTs)?" Oct. 10, 2022, https://beincrypto.com/learn/soulbound-tokens-sbts/#h-benefits-of-soulbound-tokens (23 pages).

Dennison Bertram, "How to Create a Soulbound Governance Token in 5 Minutes (or Less!)," Jun. 2, 2022, https://blog.tally.xyz/how-to-create-a-soulbound-governance-token-in-5-minutes-or-less-4151d2164b9d (7 pages).

* cited by examiner

100

| | | |
|---|---|---|
| 102 — Origin Address | 0x23d04b2210aFC3b92c47FBd64B c39eFBA1306069 | |
| 104 — Target Address | 0x23Dc750bb2B52514F1f2300F0fd 51F119272D698 | |
| 106 — Target User Identifer | Name 110 | Jhanvi Murugan |
| | Correspondence Address 112 | 123 Main St |
| 108 — Indication of Cryptographic Resources | 0.0023 ETH | |

```
122 contract {

124     function mint(address to){

126         Token = generate(TokenID);

128         Token.mint(to);

130         setTokenURI(TokenID);

}

132     function beforeTokenTransfer{

134         require(from == address(0) and to == address(0));

| Creator | Owner | Smart Contract Address | Token ID | Uniform Resource Identifier ||
|---|---|---|---|---|---|
| | | | | URN | URL |
| 0xBC4CA0Ed A7647A8aB7 C2061c2E118 A18a936f13D | 0x23Dc750bb 2B52514F1f2 300F0fd51F4 19272D698 | 0x06012c8cf97baad5deae2370 70f958 7f8e7a266d | 49214 | urn:isbn:0-343-23425-4 | https:// 23423.ac.uk |

FIG. 1C

SYSTEMS AND METHODS FOR VERIFYING CRYPTOGRAPHICALLY SECURED COMMUNICATIONS BETWEEN USERS USING NON-TRANSFERABLE TOKENS

BACKGROUND

In recent years, the use of blockchain technology for various applications, including, but not limited to, smart contracts, non-fungible tokens, cryptocurrency, smart finance, blockchain-based data storage, etc. (referred to collectively herein as blockchain applications) has exponentially increased. Each of these applications benefits from blockchain technology that allows for the recording of information that is difficult or impossible to change (either in an authorized or unauthorized manner). For example, a blockchain is essentially a digital ledger of transactions that is duplicated and distributed across the entire network of computer systems on the blockchain. That is, the digital ledger of a blockchain is a decentralized source of information that does not require a central authority to monitor transactions, maintain records, and/or enforce rules. Instead, technology underlying the blockchain network, namely cryptography techniques (e.g., secret-key, public-key, and/or hash functions), consensus mechanisms (e.g., Proof of Work (POW), Proof of Stake (POS), Delegated Proof of Stake (dPOS), Practical Byzantine Fault Tolerance (pBFT), Proof of Elapsed Time Broadly (PoET), etc.), and computer networks (e.g., peer-to-peer ("P2P"), the Internet, etc.) combine to provide an decentralized environment that enables the technical benefits of blockchain technology.

However, despite these benefits and despite the wide-ranging number of potential applications, practical implementations of blockchain technology have been hindered by several technical problems. First, blockchain technology often relies on large amounts of energy and dedicated resources to ensure that consensus mechanisms (e.g., POW) run. Second, despite the mainstream popularity of blockchain technology, practical implementations of blockchain technology require specialized knowledge to design, program, and integrate blockchain technology-based solutions, which limits the amount of people and resources available to create these practical implementations. Third, blockchain technology, despite its decentralized nature, faces scalability issues and/or low transaction speeds when attempting to accommodate a large number of users at a given time. Finally, depending on the application and the intent of the users, the key benefits of blockchain technology such as a public ledger, use of digital wallets, and immutable transactions may be seen negatively by users that wish to maintain privacy of transactions, wish to know the true identities of users involved in transactions, and wish to reverse unauthorized transactions, respectively. These technical problems present an inherent problem with attempting to use a blockchain technology-based solution in dynamically validating communications based on target addresses and communication metadata.

SUMMARY

Methods and systems are described herein for novel uses and/or improvements to blockchain technology. As one example, methods and systems are described herein for validating blockchain communications through the verification of non-transferable non-fungible tokens that indicate a given target address's security credentials. For example, the system may verify recipients of cryptographic resources (e.g., cryptocurrency or non-fungible tokens) based on issuance of a non-transferable non-fungible token to the recipient's address prior to transfer.

Existing systems may lack contextual information regarding the authenticity or trustworthiness of blockchain target addresses (e.g., cryptography-based storage application addresses), as blockchain communications may mask the identity of recipients of cryptographic resources. For example, during a blockchain communication, a user may only have information regarding a target address for the communication and may only access limited metadata information regarding this target address, such as previous transactions stored on a blockchain node. However, a user may lack other important information regarding a target address, such as a name or identity of an address controller, a physical location, or a reputability of the target address. Current blockchain systems may utilize certificates to enable users to verify digital details provided by a given target address independently. However, this conventional certificate system does not directly verify a cryptography-based storage application address and may not enable independent verification on the blockchain, thereby leading to security issues regarding the certificates. Additionally, certificates may become obsolete and may be relevant to only a time of creation of the certificate, thereby requiring reissuing over time. Thus, blockchain communications, as currently implemented, may suffer from falsified certificates and obsolescence and, thus, malicious behavior or communication errors, due to the lack of information or falsification of certificates regarding the target address.

Adapting blockchain technology for this practical benefit faces several technical challenges, such as determining how to validate a target address in a non-transient way, such that the verification may not be transferred between entities upon issuance in a misleading manner. Additionally, verification may require access to details that may not be immediately accessible on the blockchain, such as correspondence addresses, identity information (e.g., a verified legal name), or reputation information. Conventional systems may also not clearly detect when a communication may be taking place, requiring manual requests for certificates or authentication of target addresses on demand. Thus, adapting blockchain technologies to verification of target addresses may benefit from solving the technical challenge of detecting key communication information and validating this information dynamically, upon requesting the transmittal of a communication, to prevent delays in authorizing the communication.

To overcome these technical deficiencies in adapting blockchain technology for this practical benefit, methods and systems disclosed herein may issue a non-transferable token (e.g., a non-fungible token) to verified controllers of target addresses, which may comprise information relating to the token's owner (e.g., a user identifier), as well as metadata regarding the token. The token may generate a non-transferable token in order to prevent transfer of the token following its minting and conferral to a verified controller of a target address (e.g., standard tokens, which may be received by other cryptography-based storage applications). For example, smart contracts that provide for the minting of standard tokens may exhibit "Before Transfer" and "After Transfer" functions that enable the tokens to be distributed to other cryptography-based storage applications. Thus, a conventional non-fungible token associated with a particular, verified target address may be transferred, sold, or given to other entities, out of the control of the original minter of the non-fungible token. Thus, with a standard token, a system would not be able to utilize possession of the token as an indicator for the trustworthiness of a given entity. As such, the disclosed embodiments generate a non-transferable token by modifying a "Before Transfer" function in order to prevent transfers out of a given cryptography-based storage application following minting. For example, the system may generate a non-fungible token that only enables transfers from a zero address (i.e., an invalid address for a cryptography-based storage application), thereby preventing transfers following minting. Thus, any owner of such a non-fungible token may be, verifiably, the entity to which the token was conferred in the first place.

By generating a non-transferable token, the system may ensure that the verification details provided within may not be transferred or sold to other entities, thereby ensuring their relevance to the entity to which they have been conferred. The system may use the non-transferable token to validate further requests for communications with the associated target address. For example, the system may subsequently receive a request for a communication from a user to the target address, such as a request to transfer cryptographic resources, such as non-fungible tokens (NFTs) or cryptocurrency reserves (e.g., bitcoin or ether). The system may detect whether a target address corresponds to the owner of a previously minted non-transferable token and generate a warning or a confirmation in response. In some embodiments, the non-transferable token may provide additional metadata information that may be changed and modified over time, such as through updating information stored on a uniform resource identifier, thereby enabling verification detail updates to prevent obsolescence. Accordingly, the methods and systems disclosed herein provide the practical benefit of enabling verification of target addresses for blockchain transactions in a dynamic manner immediately upon requests for blockchain communications. By doing so, the system may improve mitigation of malicious or erroneous blockchain transactions by enabling users to reconsider such communications upon verification or lack thereof.

In some aspects, the system may receive a first user identifier for a first user. The system may determine a first blockchain address for the first user based on the first user identifier. The system may generate a first non-transferable token corresponding to the first user. This first non-transferable token may be generated by generating a non-fungible token. The non-fungible token may include token metadata, wherein the token metadata includes a first token identifier, the first user identifier, and the first blockchain address. Based on the first blockchain address, the system may assign an owner of the non-fungible token to be the first user. The system may modify a transfer function for the non-fungible token to generate an error code upon transfer.

The system may receive, from a second user, a request for a communication wherein the request for the communication includes communication metadata. The system may extract, from the communication metadata, a target address and a target user identifier. Based on the target address and the target user identifier, the system may determine that the communication metadata matches the token metadata. Based on determining that the communication metadata matches the token metadata, the system may determine a validation status for the communication. The validation status may indicate whether the target address controls the first non-transferable token.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 1A shows an illustrative diagram for a data structure that includes communication metadata from a request for a communication between an origin and a target, in accordance with one or more embodiments.

FIG. 1B shows illustrative pseudocode for generating a non-transferable token, in accordance with one or more embodiments.

FIG. 1C shows illustrative token metadata for a non-transferable token with a uniform resource identifier, in accordance with one or more embodiments.

DETAILED DESCRIPTION OF THE DRAWINGS

Figure 2:
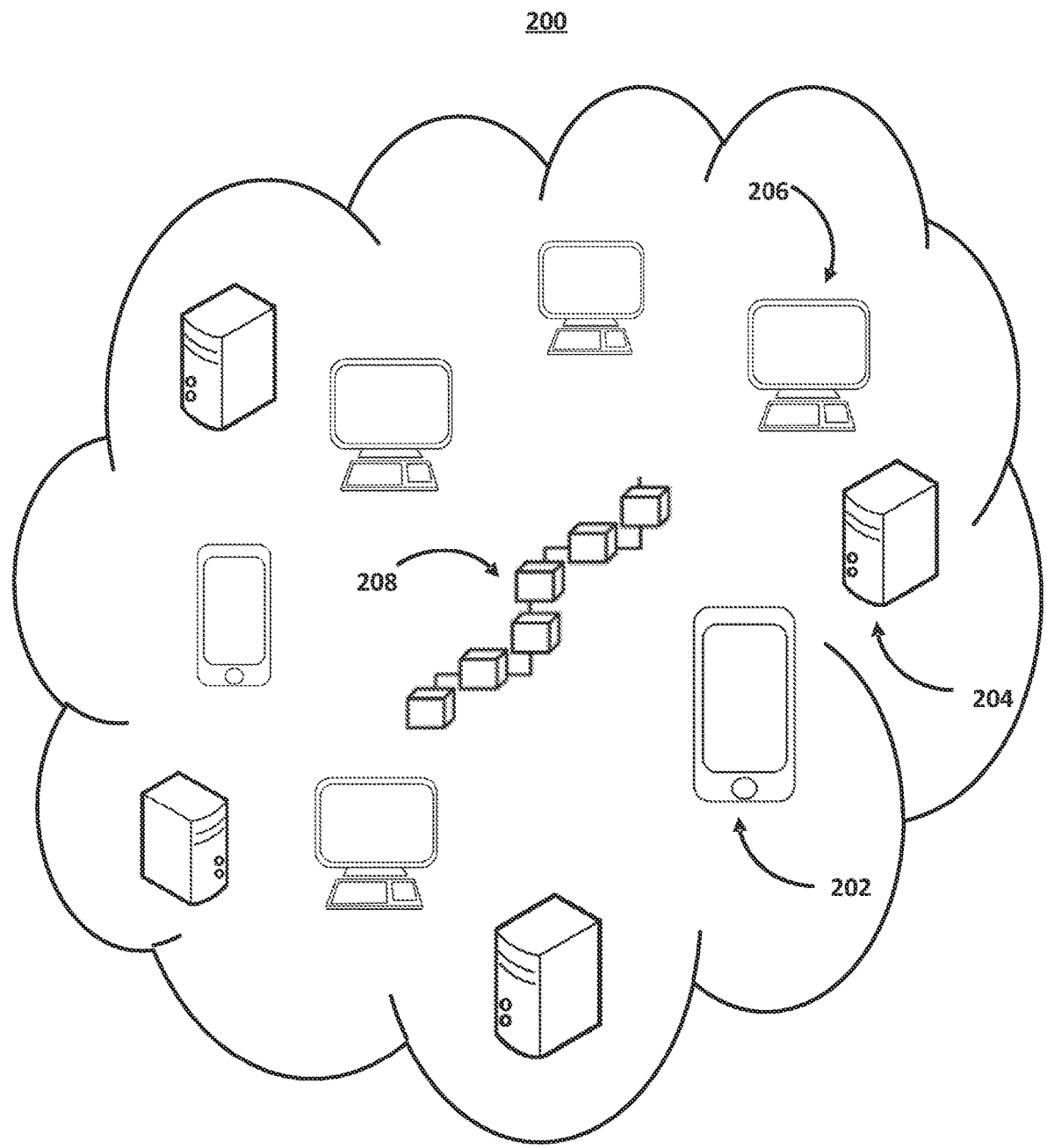
FIG. 2 shows an illustrative diagram for a blockchain network, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIG. 1A shows an illustrative diagram for data structure 100 that includes communication metadata from a request for a communication between an origin and a target, in accordance with one or more embodiments. For example, a request for a communication may include communication metadata, which can include any information pertaining to a digital communication, including information related to a sender, receiver, and the nature/medium of the transmission. For example, communication metadata may comprise origin address 102, indicating the origin of the communication (e.g., an address associated with the user making the communication request), as well as target address 104 and/or target user-identifier 106, indicating the destination or recipient for the communication. In some embodiments, the request may include an indication of cryptographic resources 108. The origin address and target address may include an address for a cryptography-based storage application, such as a cryptowallet. For example, a user may input such communication information in a mobile application form submitted to the system for further processing and transmission to the intended recipient. The system may subsequently treat such a form as a request for a communication. In some embodiments, the request for the communication may include information identifying the target user, such as name 110 and/or correspondence address 112. Additionally, or alternatively, the request for the communication may include an indication of cryptographic resources, such as a value of cryptocurrency to be transferred from one cryptography-based storage application to another. By receiving a request for a communication, and by extracting or retrieving communication metadata relating to the intended recipient or destination based on this request, the system enables dynamic evaluation of the trustworthiness of the recipient prior to transmission of the communication.

In disclosed embodiments, a communication may include any digital message, data, information, or resources transmitted between users or devices. For example, communications may include a transmission of encrypted data, messages (such as those including digital signatures), and/or transmission of control of cryptographic resources, such as non-fungible tokens and/or cryptocurrency. In disclosed embodiments, encrypted data may include information, numerical data, or textual data that has been encrypted with an encryption algorithm. For example, encrypted data may be encrypted using symmetric-key encryption algorithms, such as stream ciphers, substitution ciphers or block ciphers. Symmetric-key encryption may ensure that shared secrets may be disseminated and read only by those with designated access (e.g., those with whom a secret key has been shared). For example, encryption may satisfy the Advanced Encryption Standard (AES). Encrypted communications may utilize asymmetric-key (or public-key) encryption algorithms, such as elliptic curve cryptography (e.g., Elliptic Curve Digital Signature Algorithm (ECDSA) or Elliptic Curve Diffie-Hellman) or the Rivest-Shamir-Adleman (RSA) cryptosystem. By utilizing an asymmetric key, a user may ensure that only intended recipients may read a message. For example, a user may encrypt a message using the intended recipient's private key, thereby generating a ciphertext. The intendent recipient may decrypt the message using their own private key, connected to the associated public key using a cryptographic function. Thus, the system enables requests for communications to be received by the system, enabling digitally secured communications between users.

The system may be used to send or receive digital communications with associated digital signatures. In disclosed embodiments, digital signatures may include mathematical schemes for verifying the authenticity of digital messages, documents, or other data/information. Digital signatures may provide indications that a message was created by a known sender (e.g., authentic) and unaltered in transit (e.g., integrity). Digital signatures may utilize asymmetric cryptography. For example, a first user may append a signature encrypted based on the first user's private key and based on a message (e.g., an encrypted hash of the message), and send these to a second user. The second user may utilize the first user's public key in order to verify the authenticity of the message and may compute a hash of the message to ensure that it has not been altered following sending. By receiving and handling digital signatures, the system may enable digitally secured transmissions between users. In some embodiments, the system may execute additional verification steps for verifying the intended recipient, for example, through non-transferable tokens conferred to the recipient. Thus, the system improves evaluation of given digitally secured transactions, such as those generated using digital signatures.

The system may be used to send, receive, or handle cryptographic resources. In disclosed embodiments, a cryptographic resource may include any asset, feature, or element that may be a transferable digital representation. In some embodiments, cryptographic resources may be designed in a way that prohibits their copying or duplication, and may include cryptocurrency reserves, such as bitcoin or ether. For example, an indication of cryptocurrency reserves to be sent or received may include a value of bitcoin or ether for which control will be transferred to another user. In some embodiments, cryptographic assets may comprise non-fungible tokens or security tokens, such as a token that represents a car's vehicle identification number. As cryptographic resources may be digitally protected and sensitive, a sender of such resources may benefit from verification of the intended recipient. For example, as standard blockchain communications are not reversible, a sender of cryptographic resources through a blockchain may benefit from verifying that a recipient of such resources is trustworthy and indeed the intended recipient. By issuing non-transferable tokens to addresses that may be trustworthy, the system may improve user confidence in blockchain communications, by verifying intended recipients of requested communications prior to executing the communications.

Cryptographic resources and/or messages may be sent using cryptography-based storage applications. In disclosed embodiments, a cryptography-based storage application may include any type of application, software or program that enables storage of cryptographic resources. In some embodiments, a cryptography-based storage application may include a cryptowallet, for example, which may comprise cryptocurrencies, security tokens, and/or non-fungible tokens. In some embodiments, cryptography-based storage applications may have an address associated with them, known as a cryptography-based storage application address, which may comprise an alphanumeric or hexadecimal string, for example, that is allocated on a blockchain network. In some embodiments, the cryptography-based storage application address may correspond to the cryptography-based storage application's public key. In some embodiments, the cryptography-based storage application may comprise or be associated with a private key. In some embodiments, the cryptography-based storage application may be accessible via a blockchain network. By utilizing cryptography-based storage applications and their related security features, cryptographic resources may not only be stored securely, but they may also be transferred securely using, in some embodiments, asymmetric encryption, such as an elliptic curve digital signatures encryption algorithm. As cryptography-based storage applications may comprise addresses and may be associated with an owner or another entity, the system may utilize cryptography-based storage applications in order to identify the trustworthiness of such an entity. For example, the system may leverage a communication history on the blockchain associated with a given cryptography-based storage application to evaluate such an owner, as well as confer a non-transferable token to this address to validate the address and owner.

FIG. 1B shows illustrative pseudocode 120 for generating a non-transferable token, in accordance with one or more embodiments. For example, in line 122, pseudocode 120 defines a contract (e.g., a smart contract, or another type of self-executing program), which enables creation of non-transferable tokens. In line 124, the contract exhibits the ability to mint a token to an address (e.g., an address for a cryptography-based storage application, given the name "to"), using the "mint" function. The "mint" function comprises a "generate" function, as shown in line 126, which enables the generation of a token with a given token ID. The function may then mint the token to the "to" address, as shown in line 128, and set a uniform resource identifier (URI) to point to the relevant token ID, as shown in line 130. The system can also define a function (e.g., function "beforeTokenTransfer") that is executed prior to allowing the transfer of the generated token, as shown in line 132. In disclosed embodiments, this function may include a "require" statement, which may require that the address be a particular address, such as the zero address, before a token transfer is allowed. For example, line 134 in FIG. 1B requires the "from" address of a transfer of the token to be the zero address (i.e., not a valid cryptography-based storage application address) before transfer, effectively making the minted token non-transferable. By doing so, the system may ensure that the token, once minted, cannot be transferred to other entities. Thus, any tokens that are conferred to a given entity based on an evaluation of the entity's trustworthiness may not be transferred away to another address in a misleading way, making the token a robust indicator of the entity's verification status. By doing so, the system may utilize tokens minted in this manner as a marker of validation status for a given recipient and, subsequently, allow or warn transactions depending on this validation status. Accordingly, the system may improve the security and confidence in blockchain communications with previously evaluated entities.

The system may utilize a self-executing program to mint non-fungible tokens. In disclosed embodiments, a self-executing program can include any computer code, program, or process that may run in response to satisfied conditions, without necessary input from a particular user or entity. For example, self-executing programs may comprise a smart contract, or any self-executing contract, written into code. The self-executing program may exist across a distributed, decentralized blockchain network. Smart contracts permit transactions and agreements to occur without the need for a central authority, legal system, or external enforcement mechanism. Thus, in the absence of centralized structures for handling cryptographic resources, as is currently the case, smart contracts and self-executing programs provide effective ways to handle communication requests as they occur. For example, self-executing programs may only mint non-fungible tokens if conditions are met, such as a demonstration of trustworthiness or of identity by an entity. Additionally, or alternatively, by utilizing self-executing programs, the system may mint a non-fungible token such that it may not be transferred after conferral to an entity, as shown in line 134 in FIG. 1B. By relying on self-executing code to generate non-fungible tokens, the system may incorporate such safeguards and conditions in order to maintain the integrity of conferred tokens as indicators of an entity's validity, trustworthiness, and/or reputation.

The system may generate non-fungible tokens. In disclosed embodiments, a non-fungible token may include a data structure recorded on a blockchain that represents a token, the control of which may be passed from one identifier to another (e.g., from one cryptographic address to another). The token may represent a good, a service, or another entity. For example, a cryptographic token may be non-fungible, as it may not be equivalently switched for another token. In some embodiments, a cryptographic token may include a URI (e.g., a uniform resource locator (URL) or a uniform resource name (URN)), and may include an identifier (i.e., a token identifier). A cryptographic token may be provided to entities that are deemed trustworthy and may include or link to information related to the entity, such as a URL to a website with information about a charity making a transfer request. A cryptographic token may include an identifier, such as an alphanumeric text string or an associated smart contract, which allows the token to be identified in transactions made on a blockchain. Thus, a non-fungible token may represent an entity and its trustworthiness and/or reputability.

The system may generate non-transferable tokens, such as non-transferable fractional tokens. In disclosed embodiments, a non-transferable token may include a token, such as a non-fungible token, that may not be transferred to other users upon satisfaction of a condition (e.g., upon minting). As depicted in FIG. 1B, a non-transferable token may be generated by modifying the code underpinning a non-fungible token. In some embodiments, the system may generate a non-transferable token intrinsically. Additionally, or alternatively, the system may generate a standard non-fungible token and modify a function, such as a transfer function, to not allow subsequent transfer of the token. In disclosed embodiments, a transfer function may include a function involved in the generation or operation of a non-fungible token that is involved with transfers. For example, the system may modify a program for minting a non-fungible token to include a condition for allowing transfer of the token that is impossible to satisfy (e.g., that the "from" address of the token be a zero address). In some embodiments, an entity may request that the system generate a non-transferable token. This request may effectively be a request for the system to verify the entity's identity and trustworthiness. Thus, in some embodiments, the system may receive a registered address, authentication information, and a communication history associated with the entity in order to evaluate the entity's identity and trustworthiness and, subsequently, confer a respective non-transferable token representing the entity's status. By doing so, the system may ensure that any non-fungible tokens conferred to an entity in order to represent their trustworthiness (e.g., a validation status) may not be transferred to another undeserving entity. Thus, the minted token, being non-transferable, may be a robust, non-transient indicator of an entity's reputation.

In some embodiments, the system may generate the non-transferable token to generate an error code when the origin address for a transfer of the non-transferable token is not the zero address. In disclosed embodiments, an error code may include an indication, message, or warning that the non-transferable token may not be transferred. For example, the indication may include a string of text indicating that the transfer of the token is not possible. In some embodiments, the string of text may be generated for display on a user interface. By including an error code upon transfer of the token, the system may ensure that attempts to transfer the token are unsuccessful. Therefore, the system may ensure that an entity may not transfer a non-transferable token to other entities that have not participated in a validation or verification process.

In some embodiments, the system may receive, along with a request for non-transferable token generation, a user identifier. A user may include an entity, such as an entity requesting verification by the system. In some embodiments, a user may include a recipient of cryptographic resources or cryptographic communications, such as encrypted messages (e.g., an intended recipient thereof). In disclosed embodiments, a user identifier may include identification for a user, such as a name, username, serial number, or another identifier of a user. In some cases, the system may determine a target user identifier, representing a user identifier of an intended recipient of cryptographic resources, communications, or other digital data. The system may retrieve or include a list of verified user identifiers, which may comprise user identifiers that have already been evaluated in some way, such as evaluated for trustworthiness and/or accuracy of identity. By including a user identifier, the system may evaluate whether an entity requesting non-transferable token generation may be deserving of such a token using an identifier of the entity, i.e., the user. For example, the system may conduct a search (e.g., a web search or a search through blockchain transactions recorded on a blockchain node) in order to determine whether a user or a user identifier corresponding to the user has been flagged for malicious behavior or has otherwise developed an unfavorable or favorable reputation. Thus, the system may make a more accurate decision regarding whether to confer a non-transferable token to the entity symbolizing its validity and/or verified status based on this contextual information regarding the entity's identity.

In some embodiments, the system may receive, along with a request for non-transferable token generation, a correspondence address or a registered address. In disclosed embodiments, a correspondence address may include an indication of an entity's location, correspondence details, or contact information, including an address of registration with an authority. For example, a correspondence address may include a registered address, such as an official address for a registered company or firm, or a domicile address for the entity. By receiving a registered address, the system may more easily verify an entity's trustworthiness. For example, the system may look up an identifier of the entity in a database of entities (such as a username in a database of usernames) and determine if it matches with the registered address received along with the receipt. By doing so, the system may evaluate whether the identity of the entity requesting the conferral of the token matches with the identity of previously verified entities.

The system may receive authentication information relating to the entity that is additional or alternative to the registered address. For example, authentication information may include information relating to the entity's reputation, trustworthiness, or behavior. Communication history pertaining to the entity, such as a list of transactions or communications, may be included within authentication information. For example, the system may receive or generate a list of communications to and from an address (e.g., a blockchain address) that is linked to the given entity. Based on the communications (e.g., unexpected frequency, or an observation that there are many communications with other entities that are flagged for fraud or malicious behavior), the system may determine whether the entity may be trustworthy or not and, in response, may determine to issue a non-transferable token or not. Thus, authentication information, such as a communication history, may be relevant to the system's conferral of a token and, more generally, the system's entity verification process.

The system may generate non-transferable fractional tokens. In disclosed embodiments, a non-transferable fractional token may include parts of a whole non-fungible token, where each part may be owned by multiple or distinct entities. For example, a smart contract may create a set of tokens linked to an invisible original token. Certain entities may possess control of various cryptography-based storage applications, each with its own associated address. By generating a set of fractional tokens, the system may confer a portion of a validation token to these multiple addresses that may correspond to a single entity. Thus, each of these addresses may be associated with the underlying token, thereby enabling verification of the entity's trustworthiness by reference to any one of the addresses under its control. By making these fractional non-fungible tokens non-transferable as well, the system may ensure that these fractional tokens may not be transferred to undeserving entities either, thereby maintaining their robustness and accuracy as indicators of the associated entity's trustworthiness.

The system may determine blockchain addresses, for example, corresponding to user identifiers. In disclosed embodiments, a blockchain address may include an identifier of a location, such as a storage location, node location, or server location. In some embodiments, a blockchain address may correspond to a hashed public key associated with a cryptography-based storage application (e.g., a cryptowallet). A blockchain address can be an alphanumeric string of characters; in some embodiments, the blockchain address may be 26-35 characters in length. For example, a blockchain address may be a hexadecimal number, such as those shown as origin address 102 or target address 104 in FIG. 1A. As blockchain addresses may be the principal means for defining blockchain communication endpoints (such as a location for the minting of a non-fungible token), determining a blockchain address may enable the system to generate a non-transferable token and confer it to the entity, through the blockchain address corresponding to the entity. For example, the system may include a blockchain address corresponding to the entity in the "to" variable and mint the token within this address, as shown in FIG. 1B on lines 124 and 128, respectively. The system may determine, categorize, or utilize various forms or types of blockchain addresses. For example, the system may extract a target address or a destination address from a request for a communication, where the target address may include a blockchain address that is an intended recipient of the communication. In some embodiments, the system may determine an origin address for the communication, which may be a blockchain address corresponding to a user intending to transmit a communication to another address. In some embodiments, the system may compare an origin address or a destination address to a zero address. A zero address, or a null address, may be an address that has no value or a value of zero. A zero address may indicate that a new contract (e.g., a new token) is being generated or created, for example. Thus, by modifying a transfer function to allow transfers only from the zero address, the system may ensure that the generated token may not be transferred following conferral to an entity.

In some embodiments, the system may determine whether the blockchain address corresponding to an entity is a malicious blockchain address. In disclosed embodiments, a malicious blockchain address may include an address that has been flagged by the system, or other authorities, organizations, or entities, as being suspicious, fraudulent, unverified, or otherwise malicious. For example, a malicious blockchain address may be an address associated with an entity known for phishing scams or other fraudulent transactions or behavior. In disclosed embodiments, the system may determine that an entity's address is on a list of malicious addresses and, therefore, that a non-transferable token should not be conferred to the entity. Thus, the system may ensure that unverified, malicious entities may be excluded from the verification process.

FIG. 1C shows illustrative token metadata in data structure 140 for a non-transferable token with a uniform resource identifier, in accordance with one or more embodiments. For example, a generated non-transferable token may include token metadata that comprises creator field 142, owner field 144, smart contract address 146, token identifier 148, and uniform resource identifier 150. Uniform resource identifier 150 may include further fields, such as uniform resource name 152 and uniform resource locator 154. By including token metadata, the system may extract information related to the token that may be helpful in verifying the conferral of the token to a given entity. For example, the system may verify that the token was conferred to the claimed entity, based on owner field 144, token identifier 148 and/or information linked to uniform resource identifier 150.

The system may generate or retrieve token metadata relating to a non-fungible token. In disclosed embodiments, token metadata may include information relating to the properties of the token. For example, token metadata may include an identifier of the token (e.g., token identifier 148, such as a token ID or serial number associated with a smart contract), and/or of the one or more owners of the token (e.g., a blockchain address corresponding to the entity owning the token). Token metadata may also include information relating to the creation of the token, such as an address that created the token, a creation time, and/or a purpose for creation. In some embodiments, the token metadata may include a smart contract address or another address pointing to the self-executing program associated with its generation (e.g., smart contract address 146). In some disclosed embodiments, the token and/or the token metadata may be associated with a uniform resource identifier (e.g., uniform resource identifier 150), which may include a URN and/or a URL. By retrieving this token metadata, the system may retrieve information regarding the conferral of the token and the associated owner in order to evaluate requests for communication so that, for example, a target address may be verified as corresponding to the owner of a previously generated non-transferable token. Thus, the system may dynamically evaluate and verify information relating to requests for communication as they are received by cross-referencing the communication metadata with token metadata and matching relevant information.

In some embodiments, the token metadata may include an identifier of an owner. In disclosed embodiments, an owner may include an entity, user, or device that may control the token or have possession over the contents or associated elements of the token. For example, a token may be associated with a blockchain address, such as the address to a cryptography-based storage application. An owner may include a user, device, or entity that is in control of that cryptography-based storage application that is associated with the token. For example, an owner may be identified by a user identifier, name, username, or the address of the cryptography-based storage application controlled by the owner. By specifying an owner of the token within the token metadata, the system may determine whether an entity owning the token matches with, for example, an intended recipient of a request for a communication. By determining a match, the system may verify that the recipient of the communication may be associated with a non-transferable token and, therefore, may verify that the recipient may be trustworthy and/or verified. Thus, by determining an owner within the token metadata, the system may improve the accuracy of validation of entities that may potentially receive communications or other cryptographic resources.

Token metadata can include URIs. In disclosed embodiments, uniform resource identifiers may include an indication (e.g., a string of characters) that identifies a logical or physical resource. For example, URIs may identify anything, including real-world objects, people and places, concepts, or information. In disclosed embodiments, URIs may identify information relating to an owner of a token or an entity associated with a token. For example, URIs may include a reference to a database that includes information relating to the entity, such as the entity's name and correspondence address. In some embodiments, the uniform resource identifier may include URN (e.g., a database name) and/or a URL. A URN may include the identification of a resource by a name in a particular namespace, such as a database identifier in a known set of databases. A URL may include a means of obtaining a representation of a digital resource, such as a network location specified using the Hypertext Transfer Protocol (HTTP). For example, a URL may reference a location of a database entry that stores information relating to the entity, such as an entity address, name, and/or information relating to its reputation or trustworthiness.

In some embodiments, a uniform resource identifier associated with a token and/or token metadata may include or reference a cloud-based storage location. For example, a cloud-based storage location may include an identifier of a location of data transmitted and/or stored on remote storage systems, which may be maintained, managed, backed up and/or made available to users over a network, such as an internet or intranet. For example, a cloud-based storage location may be referenced by a URL associated with a cloud service, such as Amazon Web Services or Google Drive. By including entity-related information in a uniform resource identifier that points to cloud-based storage controlled by the system, the system may monitor and change information associated with the conferred token dynamically. For example, if the entity controlling the token is found to partake in malicious behavior, the system may modify the cloud-based storage location to include a note that disqualifies the token from validating the entity. Thus, the system may dynamically update validation information relating to entities, thereby ensuring the continued safety and security of communication requests through the system.

In disclosed embodiments, the system may determine a validation status for a request for communication. For example, the validation status may be an indicator as to whether a target address for the requested communication controls a non-transferable token. In some embodiments, the system may make this determination based on comparing communication metadata with token metadata. For example, the system may determine whether the communication metadata indicates a target address that corresponds to an address corresponding to the owner of the token. In some embodiments, the system may determine a validation status by checking a location (e.g., a cloud-based storage location) linked to through the token metadata's uniform resource identifier. The location may include information relating to whether the entity is in a good standing (e.g., still unflagged for malicious behavior). The location may also include further information relating to the entity, such as a name and/or correspondence address, which may further be compared with any information in the communication metadata pertaining to the intended recipient. For example, a validation status may indicate that the intended recipient of the communication request is "verified," "unverified," or "flagged for suspicious behavior." In some cases, the validation status may be generated for display on a user interface, so that a user submitting the request for the communication may make a decision as to whether to proceed with the communication or not. In some embodiments, the system may disallow communication requests that correspond to unverified and/or flagged validation statuses. By doing so, the system may improve the security of communications requested therein.

In some embodiments, the system may generate a communication rejection message based on the validation status of an entity. In disclosed embodiments, a communication rejection message may include a message that indicates the denial of a communication request. For example, a second user may submit a request for a communication with a first user (e.g., an entity). Upon determining that the first user is not a verified entity, the system may transmit a rejection message to the second user to indicate that the request for the communication has been denied, as the validation status of the first user was not satisfactory. By doing so, the system may prevent communications that may be a breach of security, thereby protecting the second user from sending a potentially harmful communication to an unverified party.

In disclosed embodiments, the system may generate a dialog box that displays the validation status on a user interface. A dialog box may include a graphical control element in the form of a window that communicates information, such as validation status information, to a user and prompts for a response. In some embodiments, the dialog box may enable the user to submit input (e.g., a decision, or feedback through the press of a button) based on the message on the dialog box. For example, the system may display a message that states that the target address to which the user would like to transmit a communication has a validation status corresponding to "unverified." In response, the system may enable the user to select, on the dialog box, whether to proceed with the communication or not, for example, through a radio button or other buttons. By doing so, the system confers control of the communication to the user, while providing information that may inform the user as to the risk associated with the given communication and intended recipient.

In some embodiments, the system may generate a non-transferable token based on a database of verified users. For example, the system may retrieve user identifiers that correspond to previously verified entities, which may be stored on a database. For example, an authority or a system for verifying digital entities may include a list of reputable users, identified by a user identifier such as a username or an entity name and/or address. The system may retrieve such names or identifiers from a database comprising this information and utilize this list in order to validate whether to generate a non-transferable validation token for this entity. By doing so, the system may cross-reference entities requesting validation with other sources, thereby improving the accuracy and security of a validation decision and subsequent conferral of a non-transferable token that indicates such validation.

In some embodiments, the system may determine a user reputability score for a user that possesses control of non-transferable tokens based on the metadata within such tokens. For example, a user may possess control of various tokens corresponding to different blockchain addresses, which may all be controlled by the user as well. The system may calculate a user reputability score for the user based on information included within the token metadata corresponding to these tokens. In disclosed embodiments, a user reputability score may be an indication, qualitative or quantitative, of the reputability of the user. The user's reputability may include a characterization of the behavior of the user as trustworthy or not. For example, a user reputability score may include a percentage of transactions within the user's blockchain history that are not classified as suspicious or malicious. In some embodiments, a user reputability score may be an indication of reviews left by users of the entity's services, or previous users who have transmitted communications to the entity. By calculating a user reputability score, the system may improve the information used to determine whether to generate further non-transferable tokens to represent the trustworthiness of the entity. Additionally, or alternatively, the system may determine the validation status of a communication request based on a user reputability score relating to the intended recipient, thereby preventing communications to users with potentially low user reputability scores. For example, in some embodiments, the system may compare the user reputability score with a threshold user reputability score before allowing or validating a communication request (e.g., before determining an appropriate validation status).

In some embodiments, the system may determine a communication type for the communication request (e.g., using the communication metadata) and match this communication type with a communication type associated with the intended recipient (e.g., through a token possessed by the intended recipient of the communication). In disclosed embodiments, a communication type may include a type of transaction, communication, or message that may be routinely accepted by the owner of the non-transferable token. For example, a communication type may include an indication that an address associated with a user accepts secure communications relating to confidential scientific research. A communication request may specify that the data within also relates to confidential scientific research. Thus, the system may match the purpose of the communication with the type of communications accepted by the intended recipient, as shown through token metadata or other information, thereby improving the security of the communications and preventing the transmission of unintended communications that do not fit the recipient's mode of communication or purpose.

FIG. 2 shows an illustrative diagram for a decentralized environment for performing blockchain functions, in accordance with one or more embodiments. For example, the diagram presents various components that may be used to dynamically validate requests for communications from users based on conferred non-transferable tokens, in some embodiments.

As shown in FIG. 2, system 200 may include multiple user devices (e.g., user device 202, user device 204, and/or user device 206). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system. For example, system 200 may interact with, and facilitate the function of, blockchain 208.

It should be noted that, while shown as a smartphone, a personal computer, and a server in FIG. 2, the user devices may be any type of computing device, including, but not limited to, a laptop computer, a tablet computer, a handheld computer, and/or other computing equipment (e.g., a server), including "smart," wireless, wearable, and/or mobile devices. It should be noted that embodiments describing system 200 performing a blockchain function may equally be applied to, and correspond to, an individual user device (e.g., user device 202, user device 204, and/or user device 206) performing the blockchain function. That is, system 200 may correspond to the user devices (e.g., user device 202, user device 204, and/or user device 206) collectively or individually.

Each of the user devices may be used by the system to conduct blockchain functions and/or contribute to dynamically validate requests for communications from users based on conferred non-transferable tokens. As referred to herein, "blockchain functions" may comprise any operations including and/or related to blockchains and blockchain technology. For example, blockchain functions may include conducting transactions, querying a distributed ledger, generating additional blocks for a blockchain, transmitting communications-related non-fungible tokens, performing encryption/decryption, exchanging public/private keys, and/or other operations related to blockchains and blockchain technology. In some embodiments, a blockchain function may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain function may comprise the creation, modification, exchange, and/or review of a token (e.g., a digital blockchain-specific asset), including a non-fungible token. A non-fungible token may comprise a token that is associated with a good, a service, a smart contract, and/or other content that may be verified by, and stored using, blockchain technology.

In some embodiments, blockchain functions may also comprise actions related to mechanisms that facilitate other blockchain functions (e.g., actions related to metering activities for blockchain functions on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what can be consumed in running the smart contract. The system may terminate execution of the smart contract if the amount of gas consumed by computation exceeds the gas available in the blockchain function. For example, in Ethereum, gas comprises a mechanism for allowing Turing-complete computation while limiting the resources that any smart contract and/or blockchain function may consume.

In some embodiments, gas may be obtained as part of a blockchain function (e.g., a purchase) using a network-specific cryptocurrency (e.g., ether in the case of Ethereum). The system may require gas (or the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

As shown in FIG. 2, one or more user devices may include a digital wallet (e.g., user device 204) used to perform blockchain functions. For example, the digital wallet may comprise a repository that allows users to store, manage, and trade their cryptocurrencies and assets, interact with blockchains, and/or conduct blockchain functions using one or more applications. The digital wallet may be specific to a given blockchain protocol or may provide access to multiple blockchain protocols. In some embodiments, the system may use various types of wallets such as hot wallets and cold wallets. Hot wallets are connected to the internet while cold wallets are not. Most digital wallet holders hold both a hot wallet and a cold wallet. Hot wallets are most often used to perform blockchain functions, while a cold wallet is generally used for managing a user account and may have no connection to the internet.

As shown in FIG. 2, one or more user devices may include a private key and/or digital signature. For example, system 200 may use cryptographic systems for conducting blockchain functions such as communications of digital data, messages, or encrypted data, such as cryptocurrency or digital signatures. For example, system 200 may use public-key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain function) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain functions. As an illustration, when conducting blockchain functions, system 200 may use the digital signature to prove to every node in the system that it is authorized to conduct the blockchain functions.

For example, system 200 may comprise a plurality of nodes for the blockchain network. Each node may correspond to a user device (e.g., user device 202). A node for a blockchain network may comprise an application or other software that records and/or monitors peer connections to other nodes and/or miners for the blockchain network. For example, a miner comprises a node in a blockchain network that facilitates blockchain functions by verifying blockchain functions on the blockchain, adding new blocks to the existing chain, and/or ensuring that these additions are accurate. The nodes may continually record the state of the blockchain and respond to remote procedure requests for information about the blockchain.

For example, user device 202 may request a blockchain function (e.g., conduct a transaction). The blockchain function may be authenticated by user device 204 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain function, the blockchain function may be authorized. For example, after the blockchain function is authenticated between the users, system 200 may authorize the blockchain function prior to adding it to the blockchain. System 200 may add the blockchain function to blockchain 208. System 200 may perform this based on a consensus of the user devices within system 200. For example, system 200 may rely on a majority (or other metric) of the nodes in the community network (e.g., user device 202, user device 204, and/or user device 206) to determine that the blockchain function is valid. In response to validation of the block, a node user device (e.g., user device 202, user device 204, and/or user device 206) in the community network (e.g., a miner) may receive a reward (e.g., in a given cryptocurrency) as an incentive for validating the block.

To validate the blockchain function, system 200 may use one or more validation protocols and/or validation (or consensus) mechanisms. For example, system 200 may use a POW mechanism in which a user device must provide evidence that it performed computational work to validate a blockchain function, and thus this mechanism provides a manner for achieving consensus in a decentralized manner as well as preventing fraudulent validations. For example, the POW may involve iterations of a hashing algorithm. The user device that is successful aggregates and records blockchain functions from a mempool (e.g., a collection of all valid blockchain functions waiting to be confirmed by the blockchain network) into the next block. Alternatively or additionally, system 200 may use a POS mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 208, and the blockchain function is completed. For example, to add the blockchain function to blockchain 208, the successful node (e.g., the successful miner) encapsulates the blockchain function in a new block before transmitting the block throughout system 200.

Figure 3:
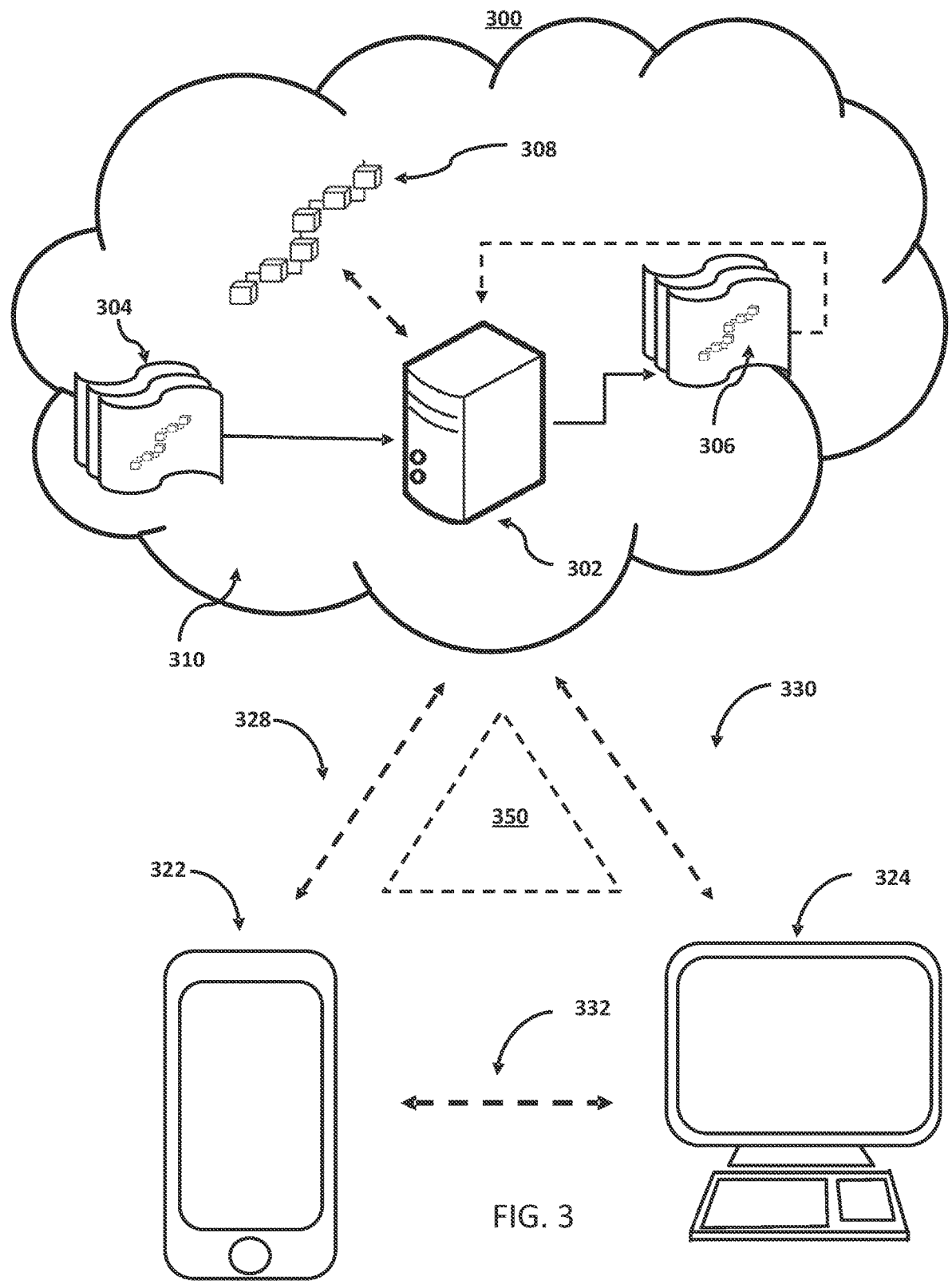
FIG. 3 shows illustrative components for a system used to generate non-transferable tokens for verifying digitally secured communications between users, in accordance with one or more embodiments.

FIG. 3 shows illustrative components for a system used to verify digitally secured communications between users utilizing non-transferable non-fungible tokens, in accordance with one or more embodiments. For example, FIG. 3 may show illustrative components for verifying requests from users to intended recipients, such as communications of secure data or cryptographic resources, using non-transferable tokens issued to verified entities capable of receiving such messages. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a handheld computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational responses, queries, and/or notifications).

Additionally, as mobile device 322 and user terminal 324 are shown as a touchscreen smartphone and a personal computer, these displays also act as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a fifth generation (5G) or long-term evolution (LTE) network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include requests for communication, which in turn may include communication metadata, as shown in data structure 100 in FIG. 1A. Cloud components 310 may, additionally or alternatively, include self-executing programs, such as pseudocode 120 depicted illustratively in FIG. 1B. Cloud components 310 may retrieve, extract, and/or generate token metadata, as shown in data structure 140 in FIG. 1C.

Cloud components 310 may access blockchain network 308 (e.g., which in some embodiments may correspond to blockchain 208 (FIG. 2)). Additionally, cloud components 310 may access information accessible to blockchain nodes, such as prior blockchain transaction information, public keys, and other cryptographic information. In some embodiments, cloud components 310 may access databases, such as databases of verified user identifiers, or databases that include lists of malicious blockchain addresses.

Cloud components 310 may include model 302, which may be a machine learning model, artificial intelligence model, deep learning model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a likelihood that a given blockchain address is malicious or trustworthy based on an associated communication history).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., whether a request for a communication request is likely to be a security risk).

In some embodiments, the model (e.g., model 302) may automatically perform actions based on outputs 306. In some embodiments, the model (e.g., model 302) may not perform any actions. The output of the model (e.g., model 302) may be used to warn users of risks associated with blockchain communications, and/or block communications to unverified entities.

System 300 also includes application programming interface (API) layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a representational state transfer (REST) or web services API layer) may provide a decoupled interface to data and/or functionality of one or more applications. API layer 350 may provide a common, language-agnostic way of interacting with an application. Web services APIs offer a well-defined contract, called Web Services Description Language (WSDL), that describes the services in terms of its operations and the data types used to exchange information. REST APIs do not typically have this contract; instead, they are documented with client libraries for most common languages, including Ruby, Java, PHP, and JavaScript. Simple Object Access Protocol (SOAP) web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API Platforms and their modules. API layer 350 may use a developer portal. API layer 350 may use strong security constraints applying web application firewall (WAF) and distributed denial of service (DDoS) protection, and API layer 350 may use RESTful APIs as standard for external integration.

Figure 4:
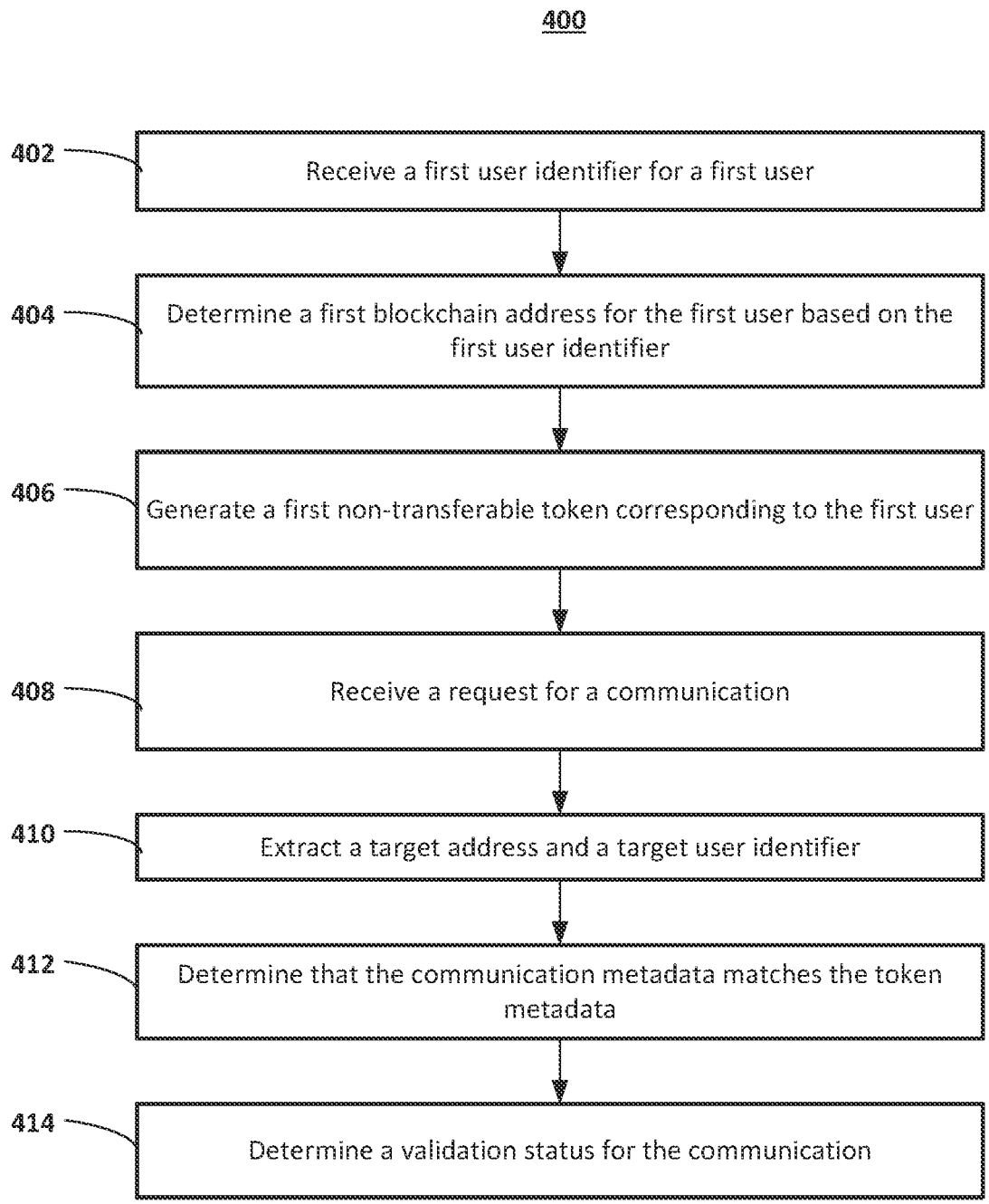
FIG. 4 shows a flowchart of the steps involved in verifying digitally secured communications between users by generating non-transferable tokens, in accordance with one or more embodiments.

FIG. 4 shows a flowchart of the steps involved in verifying digitally secured communications between users, in accordance with one or more embodiments. For example, the system may use process 400 (e.g., as implemented on one or more system components described above) in order to verify communication requests to entities using non-transferable tokens conferred to verified entities.

At step 402, process 400 (e.g., using one or more components described above) may enable the system to receive a first user identifier for a first user. For example, the system may receive a name, username, blockchain address, or another identifier that may specify the identity of a first user. By doing so, the system may receive information to identify the user to evaluate the validity and trustworthiness of the user for further verification of communications to the given user.

At step 404, process 400 (e.g., using one or more components described above) may enable the system to determine a first blockchain address for the first user based on the first user identifier. For example, the system can determine an address corresponding to cryptography-based storage application controlled by the first user. In disclosed embodiments, the first user may include this address in a request for generation of a non-transferable token. Additionally, or alternatively, the system may determine a cryptography-based storage application controlled by the first user by matching the given user identifier with a user identifier associated with a cryptography-based storage application in a database of cryptography-based storage applications (e.g., a database of verified user identifiers). By determining a blockchain address corresponding to the user, the system enables monitoring of communications to and from this blockchain address and subsequent association of the user with the blockchain address. Thus, any evaluation of the user (e.g., of the user's trustworthiness or reputability) may be linked to the users' blockchain addresses, and, therefore, communications to these blockchain addresses may be evaluated and protected.

At step 406, process 400 (e.g., using one or more components described above) enables the system to generate a first non-transferable token corresponding to the first user. The system may generate this first non-transferable token by generating a non-fungible token, wherein the non-fungible token comprises token metadata, and wherein the token metadata comprises a first token identifier, the first user identifier, and the first blockchain address. For example, the system may generate a token identifier as shown in line 126 within pseudocode 120 in FIG. 1B and include this token identifier in the token metadata, such as token identifier 148 within data structure 140. Including a token identifier in token metadata enables the token to be searchable and identifiable by the system later. By generating a token identifier for the non-fungible token and encapsulating information regarding the user within the associated token metadata, the system may incorporate information relevant to evaluating the user within the token, enabling the token to serve as an indicator of the user, the user's identity, and any other relevant information, such as an address associated with the user. By including a blockchain address associated with the user, the system may match addresses that correspond to the user in communication requests and, therefore, associate the communication request with the relevant user, thereby enabling the process for validating communications between users.

Based on the first blockchain address, in disclosed embodiments, the system may assign an owner of the non-fungible token to be the first user. For example, the system may generate the token with a "to" address (as shown on line 128 in FIG. 1B) corresponding to the first blockchain address. Thus, the system may assign the generated non-fungible token to the first user. By doing so, the system correlates the non-fungible token with the first user's blockchain address. Where the first blockchain address is encountered in the future, assigning the token to this address enables the system to associate the address with the information within the token's metadata. Thus, the system may more easily retrieve validation data encapsulated within the non-fungible token when encountering the address, improving the efficiency of validation of the user and the associated blockchain address.

In disclosed embodiments, the system may modify a transfer function for the non-fungible token to generate an error code upon transfer. For example, the system may modify a "before token transfer" function, as defined in pseudocode 120 on line 132 in FIG. 1B, to include a requirement that the transfer have an origin address equal to the zero address, as shown on line 134 in FIG. 1B. By including such a requirement and generating an error if the origin address of a transfer is not the zero address, the system enables minting of the token to a given address but prohibits further transfer of the token. Thus, the token remains associated with the user, and may not be transferred to other users in order to mislead or fraudulently verify undeserving users. By doing so, the system ensures that the token, now non-transferable, remains a robust, unchanging validator for the user and its trustworthiness and reliability.

In disclosed embodiments, the system may generate the non-transferable token such that includes a name and a correspondence address within a uniform resource identifier. That is, the system may determine a first name and a first correspondence address, wherein the first name and the first correspondence address correspond to the first user. The system may store the first name and the first correspondence address in a cloud-based storage location, wherein the cloud-based storage location is associated with a uniform resource identifier. The system may store the uniform resource identifier in the token metadata. For example, the system may determine a name and a correspondence address based on the first user's user identifier, such as through a database of entities and their registered addresses. In some embodiments, the system may receive the name and correspondence address directly from the first user. The system may store these data in a cloud-based storage location, such as Amazon Web Services or another server that may be accessible to the system. The resulting link to the storage location (e.g., a URL or URN that unambiguously identifies the storage location) may be stored within a URI and included within the token metadata. By doing so, information pertinent to the first user may be associated with the token, such that the system may associate the token with the user and user details unambiguously. Thus, the system may utilize the information stored within the token to verify the user based on this information stored within.

In disclosed embodiments, the system may generate the first non-transferable token by verifying that the user identifier provided by the first user matches one in a list of verified user identifiers. For example, the system may retrieve, from a database of verified users, a plurality of verified user identifiers. The system may determine that the first user identifier matches a verified user identifier of the plurality of verified user identifiers. Based on determining that the first user identifier matches the verified user identifier, the system may determine to generate the first non-transferable token. For example, the system may retrieve a list of user identifiers that have already been verified, such as by the system or by a verifying authority. For example, other institutions or watchdogs may monitor verified or malicious blockchain addresses and publish a list of such addresses and/or users. The system may retrieve users and determine whether the users match the user identifier of the first user. Thus, in some embodiments, the system may only issue a non-transferable token for validating a user's trustworthiness and identity only if the user has been found on a list of verified user identifiers. By doing so, the system may improve the security and validity of the non-transferable token, and further warn users against entities that have not been previously verified.

In disclosed embodiments, the system may determine other blockchain addresses controlled by the first user and generate one or more non-transferable tokens for these addresses. For example, the system may transmit, to a blockchain node, a request for blockchain addresses controlled by the first user. The system may receive, from the blockchain node, a plurality of blockchain addresses controlled by the first user. The system may determine a second blockchain address in the plurality of blockchain addresses. The system may generate a second non-transferable token associated with the second blockchain address. For example, a user may control multiple blockchain addresses, which may each be used for different purposes or for management of different accounts or communications, for example. The system can search through blockchain transactions within a blockchain node to determine other blockchain addresses that may be controlled by the first user, for example. The system may, in some embodiments, issue blockchain addresses for the user's other addresses. For example, if the system determines that there is a second blockchain address that is distinct from the first, and controlled by the same first user, the system may issue a second non-transferable token associated with the second blockchain address, in order to generate a verification mechanism for the second address as well. By doing so, the system may automatically verify all addresses associated with a given user. Thus, if the second blockchain address is encountered, the system may treat this blockchain address accordingly, thereby improving the efficiency of the blockchain address verification process.

In disclosed embodiments, the system may generate non-transferable fractional tokens associated with each blockchain address controlled by the first user. For example, the system may transmit, to a blockchain node, a request for blockchain addresses controlled by the first user and receive the plurality of blockchain addresses controlled by the first user from the blockchain node. The system may generate a second non-transferable fractional token, wherein fractions of the second non-transferable fractional token are associated with the plurality of blockchain addresses controlled by the first user. For example, having determined that the first user controls more than one blockchain address, the system may generate and split up a non-fungible, non-transferable token into fractions that are each associated with the user. By doing so, the system may link together all blockchain addresses controlled by the first user and verify these addresses in tandem. Any changes, for example, to information within the URI for one fraction may be reflected in other fractions as well, easing the verification process for the first user's information stored within the token metadata.

In disclosed embodiments, the system may determine a communication type based on the user identifier and encode this information in the token metadata. For example, the system may determine a first communication type based on the first user identifier, wherein the first communication type indicates a type of communication verified to be associated with the first user. The system may generate the first non-transferable token comprising the token metadata, wherein the token metadata comprises the first communication type. For example, the system may determine that the user identifier is predominantly associated with a given communication type (e.g., through information provided by the first user, or through information found on a database), such as confidential scientific data. The system may encode this information within the token metadata, in order to provide contextual information as to the communications expected with the first user. Thus, the system may utilize the communication type to determine the validity or compatibility of communication requests with the first user.

In disclosed embodiments, the system may generate the first non-transferable token based on a request from the first user. For example, the system may receive, from the first user, a request for non-transferable token generation, wherein the request for non-transferable token generation comprises the first user identifier, the first blockchain address, a user name, a registered address, and authentication information, and wherein the authentication information comprises a communication history relating to the first user. Based on the request for non-transferable token generation, the system may determine to generate the first non-transferable token. For example, the system may receive a request directly from the first user that includes information relevant to its verification. For example, the user may include its username, registered address, and authentication information, which may include, for example, communication history relating to the user. By including such information, the system may verify the user more efficiently and decide to generate a corresponding non-transferable token to the first user only if, for example, the information provided is consistent and valid. For example, the system may compare the information in the request with information in a database, and may evaluate the authentication information, such as the communication history, for any suspicious behavior, before deciding to generate the non-transferable token. Through these operations, the system may more accurately verify users, thereby improving the security of the user's verification.

In disclosed embodiments, the system may check that the user is not on a list of malicious blockchain addresses before conferral of the non-transferable token. For example, the system may retrieve, from a self-executing program on a blockchain node, a list of malicious blockchain addresses. The system may determine that the first blockchain address is missing from the list of malicious blockchain addresses. Based on determining that the first blockchain address is missing from the list of malicious blockchain addresses, the system may generate the first non-transferable token. For example, the system may determine whether the first blockchain address is associated with or included within a list of malicious blockchain addresses. In some embodiments, the list of malicious blockchain addresses may be included within a smart contract or other self-executing program. Thus, the system may ensure that addresses flagged for being malicious may not be conferred a non-transferable token, thereby improving the security of the system's communication verification process.

At step 408, process 400 (e.g., using one or more components described above) enables the system to receive a request for a communication from a second user. That is, the system may receive, from a second user, a request for a communication, wherein the request for the communication comprises communication metadata. For example, a second user may input information relating to a communication (e.g., transmission of an encrypted message or a cryptocurrency transaction) within a mobile application or website form accessible by the system. The form may include communication metadata, such as metadata shown in fields 102-108 in data structure 100 as shown in FIG. 1A. By receiving a request for a communication at the system, the system can monitor communications to determine whether they involve an entity previously verified through conferral of a non-transferable token.

At step 410, process 400 (e.g., using one or more components described above) enables the system to extract a target address and a target user identifier, such as from the communication metadata. For example, the system may retrieve or extract an address and user identifier corresponding to an intended recipient for the second user's communication. Such information may be included, for example, within a form submitted by the second user in their request for a communication. By extracting a target address and target user identifier, the system may extract information relevant to verifying and/or validating the intended communication, such as whether the intended recipient is trustworthy, reputable, or not. Thus, determining or detecting inclusion of a target address and target user identifier within a request for a communication enables the system to ensure that communications are only transmitted to secure or reputable entities.

At step 412, process 400 (e.g., using one or more components described above) enables the system to, based on the target address and the target user identifier, determine that the communication metadata matches the token metadata. For example, the system may determine that the target address and target user identifier match a blockchain address and user identifier that corresponds to a previously generated non-transferable token. By matching such data, the system may determine whether a user referenced with a request for a communication has been verified or not. Thus, the system may dynamically verify communication requests using the communication metadata and information regarding the target/intended recipient of the communication, thereby enabling automatic verification of blockchain functions and/or transactions.

In disclosed embodiments, determining that the communication metadata matches the token metadata involves determining that the intended recipient of the communication controls a token that corresponds to a token identifier for a previously generated non-transferable token. For example, the system may transmit, to a blockchain node, a request for a plurality of token identifiers corresponding to the target address. The system may receive, from the blockchain node, the plurality of token identifiers corresponding to the target address. The system may determine that a second token identifier of the plurality of token identifiers matches the first token identifier. For example, the system may use a query function associated with a blockchain node in order to determine whether the target address specified in the communication metadata corresponds to any tokens and, further, whether any of these tokens corresponds to the previously minted non-transferable token. Based on determining that a token controlled by the target address indeed corresponds to the non-transferable token, the system may verify that the communication involves a previously verified entity as a recipient and, therefore, that the communication metadata matches the token metadata. By performing such a matching step, the system may match the token metadata with the data within a communication, even if the specific token corresponding to the recipient has not been specified or is unknown. Thus, the system may match communication data with previously generated token metadata dynamically for further verification.

At step 414, process 400 (e.g., using one or more components described above) enables the system to determine a validation status for the communication. For example, based on determining that the communication metadata matches the token metadata, the system may determine a validation status for the communication, wherein the validation status indicates whether the target address controls the first non-transferable token. For example, the system may determine whether the target address has been verified, not been verified, or has been flagged for malicious behavior, based on whether the communication metadata matches the token metadata. The system may utilize information found within the token metadata's uniform resource identifier, such as information relating to the intended recipient and past communications or behaviors, in order to determine whether the target address is verified or not. By doing so, the system may provide dynamic verification of digitally secured communications and provide information regarding this verification to users for further consideration, risk mitigation, and protection.

In disclosed embodiments, the system may generate a dialog box and determine to execute the communication request based on user input. For example, based on determining the validation status for the communication, the system may generate a dialog box for display on a user interface, wherein the dialog box displays the validation status and wherein the dialog box enables the second user to enter an input. The system may receive, through the dialog box, the input from the second user. Based on the input, the system may transmit the communication to a blockchain node. For example, the system may display a message on a dialog box to the user that submitted the communication request. The message may notify the user of the validation status of the communication request (e.g., that the target address/intended recipient was "unverified") and may ask the user for input or a decision on whether to execute the request given this information. The user may provide this input, enabling the system to execute the communication or not, depending on the user's input. By including such a dialog box, the system not only notifies the user of the results of the communication's verification but also enables the user to have control over whether the communication proceeds or not. By doing so, the system confers control to the user over the communication, while providing the user with contextual information relating to the verification status of the intended recipient for the communication. Thus, the system enables the user to take an active role in risk management for blockchain communications.

In disclosed embodiments, the system may determine a validation status for the communication based on extracting a name and correspondence address from the communication metadata and matching this information with the name and correspondence address from the token metadata. For example, the system can extract a second name and a second correspondence address from the communication metadata. The system may determine that the first name matches the second name and that the first correspondence address matches the second correspondence address. Based on determining that the first name matches the second name and that the first correspondence address matches the second correspondence address, the system may determine the validation status for the communication. For example, the system may determine a name and correspondence address provided by the second user on the request for the communication (e.g., through a form on a mobile application) and match the name and correspondence address with those provided within token metadata for the token. Thus, the system may determine a validation status by ensuring that more than just the target addresses are consistent between the intended recipient of the message and the user verified through the non-transferable token. For example, the system may catch mistakes in the second user's communication request if the name and/or correspondence address differ from those corresponding to the target address and the token. Thus, the system enables improved error mitigation and protection against unintended or unsecure transactions.

In disclosed embodiments, the system may determine a user reputability score based on token metadata in order to determine a validation status. For example, the system may determine the validation status by determining a plurality of blockchain addresses controlled by the first user. The system may determine a plurality of non-transferable tokens, where each of the plurality of non-transferable tokens is associated with at least one blockchain address of the plurality of blockchain addresses. The system may extract a set of token metadata corresponding to the plurality of non-transferable tokens and, based on the set of token metadata, determine a user reputability score for the first user. For example, the system may determine which non-transferable tokens are controlled by the target address (e.g., a list of token identifiers) and, based on, for example, authentication information within the token metadata for all of these tokens, determine a user reputability score. The user reputability score could, for example, be based on a percentage of non-suspicious transactions or communications associated with the corresponding blockchain address. By determining a user reputability score, the system may better track and verify intended recipients of communications while quantifying the trustworthiness or reputability of such entities, providing improved contextual information to users intending to communicate with these entities.

In disclosed embodiments, the system may determine the validation status for the communication based on whether the communication type of the request for the communication matches the communication type associated with the first user. For example, based on the communication metadata, the system may determine a second communication type. The system may determine that the second communication type matches the first communication type (e.g., the communication type associated with the token metadata of the first non-transferable token). By matching communication types (e.g., information regarding the purpose or type of communications corresponding to the users), the system may ensure that the intended recipient accepts the type of communications of the communication request, as described in token metadata corresponding to the intended recipient. Thus, the system may ensure that unintended communications are not sent to the wrong address or the wrong entity.

In disclosed embodiments, the system may validate transfer of cryptocurrency reserves. For example, based on the communication metadata, the system may determine an indication of cryptocurrency reserves to be transferred. The system may compare the indication of cryptocurrency reserves to a threshold amount of cryptocurrency reserves. Based on comparing the indication of cryptocurrency reserves to the threshold amount of cryptocurrency reserves, the system may generate a message for display on a user interface indicating the validation status. For example, a communication request from the second user may request transfer of cryptographic resources, such as cryptocurrency (e.g., indicated by a value, such as 10 ETH). The system may validate the request for a transfer of cryptographic resources only if the value of such resources is above or below a threshold amount. For example, the system may block transactions above a given threshold value in order to prevent fraudulent or unreasonable transactions. In some embodiments, the system may only generate a validation status for communications involving an amount of cryptocurrency larger than the threshold in order to conserve computation resources taken up for validation of the communication, thereby only validating transactions that are significant or substantial (as compared to the threshold amount). Thus, the system provides enhanced control over risk mitigation of communications involving cryptographic resources.

In disclosed embodiments, the system may transmit a communication rejection message to the second user based on the validation status. For example, the system may determine not to transmit the communication to a blockchain node based on the validation status. The system may warn a user submitting a request for a communication that the intended recipient could not be validated (e.g., that the intended recipient does not possess control of a non-transferable token symbolizing their validity). In disclosed embodiments, the system may send a warning message to the second user (e.g., a communication rejection message) stating that the communication may not be sent to the intended recipient. Based on the validation status, the system may determine not to transmit the communication to the blockchain node. Thus, the system may, in some embodiments, have a backstop to prevent transmission of cryptographic resources or other communications to unverified entities, thereby improving the security and risk mitigation of the system.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving a first user identifier for a first user, wherein the first user comprises a recipient of cryptographic resources, and wherein the first user identifier comprises a username corresponding to the first user; determining a first blockchain address for the first user based on the first user identifier, wherein the first blockchain address comprises an address for a cryptography-based storage application; generating a non-transferable token corresponding to the first user by: generating a non-fungible token, wherein the non-fungible token comprises token metadata, and wherein the token metadata comprises the first user identifier and the first blockchain address; based on the first blockchain address, assigning an owner of the non-fungible token to be the first user; generating a transfer function associated with the non-fungible token comprising a function of an origin address and of a destination address; modifying the transfer function to determine whether the origin address is a zero address; and configuring the transfer function to generate an error code when the origin address is not the zero address; receiving, from a second user, a request for a communication, wherein the request for the communication comprises communication metadata; extracting, from the communication metadata, a target address and a target user identifier; based on the target address and the target user identifier, determining that the communication metadata matches the token metadata; and based on determining that the communication metadata matches the token metadata, determining a validation status for the communication, wherein the validation status indicates whether the target address controls the non-transferable token.

2. A method, the method comprising: receiving a first user identifier for a first user; determining a first blockchain address for the first user based on the first user identifier; generating a first non-transferable token corresponding to the first user by: generating a non-fungible token, wherein the non-fungible token comprises token metadata, and wherein the token metadata comprises a first token identifier, the first user identifier, and the first blockchain address; based on the first blockchain address, assigning an owner of the non-fungible token to be the first user; and modifying a transfer function for the non-fungible token to generate an error code upon transfer; receiving, from a second user, a request for a communication, wherein the request for the communication comprises communication metadata; extracting, from the communication metadata, a target address and a target user identifier; based on the target address and the target user identifier, determining that the communication metadata matches the token metadata; and based on determining that the communication metadata matches the token metadata, determining a validation status for the communication, wherein the validation status indicates whether the target address controls the first non-transferable token.

3. The method of any one of the preceding embodiments, further comprising: based on determining the validation status for the communication, generating a dialog box for display on a user interface, wherein the dialog box displays the validation status, and wherein the dialog box enables the second user to enter an input; receiving, through the dialog box, the input from the second user; and based on the input, transmitting the communication to a blockchain node.

4. The method of any one of the preceding embodiments, wherein generating the first non-transferable token corresponding to the first user comprises: determining a first name and a first correspondence address, wherein the first name and the first correspondence address correspond to the first user; storing the first name and the first correspondence address in a cloud-based storage location, wherein the cloud-based storage location is associated with a uniform resource identifier; and storing the uniform resource identifier in the token metadata.

5. The method of any one of the preceding embodiments, wherein determining the validation status for the communication comprises: extracting a second name and a second correspondence address from the communication metadata; determining that (1) the first name matches the second name and (2) the first correspondence address matches the second correspondence address; and based on determining that the first name matches the second name and the first correspondence address matches the second correspondence address, determining the validation status for the communication.

6. The method of any one of the preceding embodiments, wherein generating the first non-transferable token comprises: retrieving, from a database of verified users, a plurality of verified user identifiers; determining that the first user identifier matches a verified user identifier of the plurality of verified user identifiers; and based on determining that the first user identifier matches the verified user identifier, determining to generate the first non-transferable token.

7. The method of any one of the preceding embodiments, wherein determining that the communication metadata matches the token metadata comprises: transmitting, to a blockchain node, a request for a plurality of token identifiers corresponding to the target address; receiving, from the blockchain node, the plurality of token identifiers corresponding to the target address; and determining that a second token identifier of the plurality of token identifiers matches the first token identifier.

8. The method of any one of the preceding embodiments, further comprising: transmitting, to a blockchain node, a request for blockchain addresses controlled by the first user; receiving, from the blockchain node, a plurality of blockchain addresses controlled by the first user; determining a second blockchain address in the plurality of blockchain addresses; and generating a second non-transferable token associated with the second blockchain address.

9. The method of any one of the preceding embodiments, further comprising: transmitting, to a blockchain node, a request for blockchain addresses controlled by the first user; receiving, from the blockchain node, a plurality of blockchain addresses controlled by the first user; and generating a second non-transferable fractional token, wherein fractions of the second non-transferable fractional token are associated with the plurality of blockchain addresses controlled by the first user.

10. The method of any one of the preceding embodiments, wherein determining the validation status for the communication comprises: determining a plurality of blockchain addresses controlled by the first user; determining a plurality of non-transferable tokens, wherein each of the plurality of non-transferable tokens is associated with at least one blockchain address of the plurality of blockchain addresses; extracting a set of token metadata corresponding to the plurality of non-transferable tokens; and based on the set of token metadata, determining a user reputability score for the first user.

11. The method of any one of the preceding embodiments, wherein generating the first non-transferable token comprises: determining a first communication type based on the first user identifier, wherein the first communication type indicates a type of communication verified to be associated with the first user; and generating the first non-transferable token comprising the token metadata, wherein the token metadata comprises the first communication type.

12. The method of any one of the preceding embodiments, wherein determining the validation status for the communication comprises: based on the communication metadata, determining a second communication type; and determining that the second communication type matches the first communication type.

13. The method of any one of the preceding embodiments, further comprising: based on the communication metadata, determining an indication of cryptocurrency reserves to be transferred; comparing the indication of cryptocurrency reserves to a threshold amount of cryptocurrency reserves; and based on comparing the indication of cryptocurrency reserves to the threshold amount of cryptocurrency reserves, generating a message for display on a user interface indicating the validation status.

14. The method of any one of the preceding embodiments, further comprising: receiving, from the first user, a request for non-transferable token generation, wherein the request for non-transferable token generation comprises the first user identifier, the first blockchain address, a user name, a registered address, and authentication information, and wherein the authentication information comprises a communication history relating to the first user; and based on the request for non-transferable token generation, determining to generate the first non-transferable token.

15. The method of any one of the preceding embodiments, further comprising: based on the validation status, transmitting a communication rejection message to the second user; and determining not to transmit the communication to a blockchain node.

16. The method of any one of the preceding embodiments, further comprising: retrieving, from a self-executing program on a blockchain node, a list of malicious blockchain addresses; determining that the first blockchain address is missing from the list of malicious blockchain addresses; and based on determining that the first blockchain address is missing from the list of malicious blockchain addresses, generating the first non-transferable token.

17. A tangible, non-transitory, machine-readable medium storing instructions that, when executed by a data processing apparatus, cause the data processing apparatus to perform operations comprising those of any of embodiments 1-16.

18. A system comprising one or more processors; and memory storing instructions that, when executed by the processors, cause the processors to effectuate operations comprising those of any of embodiments 1-16.

19. A system comprising means for performing any of embodiments 1-16.

What is claimed is:

1. A system for verifying digitally secured communications between users using information stored within non-transferable non-fungible tokens, the system comprising:
   one or more processors; and
   one or more non-transitory, computer-readable media comprising instructions that, when executed by the one or more processors, cause operations comprising:
   receiving a first user identifier for a first user;
   determining, based on the first user identifier, a first blockchain address for the first user comprising an address for a cryptography-based storage application controlled by the first user;
   generating a non-transferable token corresponding to the cryptography-based storage application to validate the address and the first user, wherein generating the non-transferable token comprises:
   generating a non-fungible token comprising token metadata comprising the first user identifier and the first blockchain address;
   based on the first blockchain address, assigning the first user as an owner of the non-fungible token;
   generating a transfer function for transferring the non-fungible token from an origin address and to a destination address;
   modifying the transfer function to include a condition that causes an error code to be generated responsive to determining that the origin address differs from a predefined invalid address to prevent the non-fungible token from being transferred out of the address for the cryptography-based storage application;
   receiving, from a second user, a request for a communication comprising communication metadata;
   extracting, from the communication metadata, a target address and a target user identifier for the communication;
   responsive to determining that the target address and the target user identifier match the first blockchain address and the first user identifier corresponding to the non-transferable token:
      determining a validation status for the communication indicating the target address controls the non-transferable token and is verified to receive the communication;

authorize, based on the validation status, the communication; and
based on the communication being authorized, transmit the communication to the first blockchain address.

2. A method comprising:
receiving a first user identifier for a first user;
determining a first blockchain address of a first cryptography-based storage application for the first user based on the first user identifier;
generating a first non-transferable token corresponding to the first cryptography-based storage application by:
generating a non-fungible token comprising token metadata, the token metadata comprising (i) a first token identifier, (ii) the first user identifier, (iii) and the first blockchain address;
based on the first blockchain address, assigning the first user as an owner of the non-fungible token;
generating a transfer function for transfer of the non-fungible token; and
modifying the transfer function to include a condition that generates an error code based on a determination that a transfer of the non-fungible token from the first cryptography-based storage application has been requested;
receiving, from a second user, a request for a communication comprising communication metadata;
extracting, from the communication metadata, a target address and a target user identifier;
determining, based on the target address and the target user identifier, that the communication metadata matches the token metadata; and
based on the communication metadata matching the token metadata:
determining a validation status for the communication indicating the target address controls the first non-transferable token and is verified to receive the communication;
authorizing, based on the validation status, the communication; and
transmitting, based on the communication being authorized, information related to the communication to the first blockchain address.

3. The method of claim 2, further comprising:
based on the validation status, generating, for display on a user interface, a dialog box that displays the validation status, and wherein the dialog box enables the second user to enter an input; and
receiving, through the dialog box, the input from the second user, wherein the information related to the communication is transmitted to a blockchain node corresponding to the first blockchain address based on the input.

4. The method of claim 2, wherein generating the first non-transferable token comprises:
determining, for the first user, a first name and a first correspondence address;
storing the first name and the first correspondence address in a cloud-based storage location associated with a uniform resource identifier; and
storing the uniform resource identifier in the token metadata.

5. The method of claim 4, wherein determining the validation status for the communication comprises:
extracting a second name and a second correspondence address from the communication metadata; and
determining that (1) the first name matches the second name and (2) the first correspondence address matches the second correspondence address, wherein the validation status is determined based on (1) the first name matching the second name and (2) the first correspondence address matching the second correspondence address.

6. The method of claim 2, wherein generating the first non-transferable token comprises:
retrieving, from a database of verified users, a plurality of verified user identifiers; and
determining that the first user identifier matches a verified user identifier of the plurality of verified user identifiers, wherein the first non-transferable token is generated based on the first user identifier matching the verified user identifier.

7. The method of claim 2, wherein determining that the communication metadata matches the token metadata comprises:
transmitting, to a blockchain node, a request for a plurality of token identifiers corresponding to the target address;
receiving, from the blockchain node, the plurality of token identifiers corresponding to the target address; and
determining that a second token identifier of the plurality of token identifiers matches the first token identifier.

8. The method of claim 2, further comprising:
transmitting, to a blockchain node, a request for blockchain addresses controlled by the first user;
receiving, from the blockchain node, a plurality of blockchain addresses controlled by the first user;
determining a second blockchain address in the plurality of blockchain addresses; and
generating a second non-transferable token associated with the second blockchain address.

9. The method of claim 2, further comprising:
transmitting, to a blockchain node, a request for blockchain addresses controlled by the first user;
receiving, from the blockchain node, a plurality of blockchain addresses controlled by the first user; and
generating a second non-transferable fractional token, wherein fractions of the second non-transferable fractional token are associated with the plurality of blockchain addresses controlled by the first user.

10. The method of claim 2, wherein determining the validation status for the communication comprises:
determining a plurality of blockchain addresses controlled by the first user;
determining a plurality of non-transferable tokens, wherein each of the plurality of non-transferable tokens is associated with at least one blockchain address of the plurality of blockchain addresses;
extracting a set of token metadata corresponding to the plurality of non-transferable tokens; and
based on the set of token metadata, determining a user reputability score for the first user.

11. The method of claim 2, wherein generating the first non-transferable token comprises:
determining, based on the first user identifier, a first communication type indicating a type of communication verified to be associated with the first user, wherein the token metadata comprises the first communication type.

12. The method of claim 11, wherein determining the validation status for the communication comprises:
based on the communication metadata, determining a second communication type; and
determining that the second communication type matches the first communication type.

13. The method of claim 2, further comprising:
based on the communication metadata, determining an indication of cryptocurrency reserves to be transferred;
comparing the indication of cryptocurrency reserves to a threshold amount of cryptocurrency reserves; and
based on comparing the indication of cryptocurrency reserves to the threshold amount of cryptocurrency reserves, generating a message for display on a user interface indicating the validation status.

14. The method of claim 2, further comprising:
receiving, from the first user, a request for non-transferable token generation comprising the first user identifier, the first blockchain address, a registered address, and authentication information, and wherein the authentication information comprises a communication history relating to the first user; and
based on the request, determining to generate the first non-transferable token.

15. The method of claim 2, wherein the request comprises a first request for a first communication comprising first metadata, the communication metadata comprises first communication data, the target address and the target user identifier comprise a first target address and a first user identifier, the validation status comprises a first validation status, and the information related to the communication comprises first information related to the first communication, the method further comprises:
receiving, from a third user, a second request for a second communication comprising second communication metadata;
extracting, from the second communication metadata, a second target address and a second target user identifier;
determining, based on the second target address and the second target user identifier, that the second communication metadata matches the token metadata;
based on the second communication metadata matching the token metadata:
determining a second validation status for the second communication indicating that the second target address does not controls the first non-transferable token and is not verified to receive the second communication;
based on the second validation status, transmitting a communication rejection message to the third user; and
preventing at least one of second information related to the second communication or the second communication from being transmitted to a blockchain node.

16. The method of claim 2, further comprising:
retrieving, from a self-executing program on a blockchain node, a list of malicious blockchain addresses; and
determining that the list of malicious blockchain addresses is absent from the first blockchain address, wherein the first non-transferable token is generated based on the first blockchain address being absent from the list of malicious blockchain addresses.

17. One or more non-transitory, computer-readable media comprising instructions that, when executed by one or more processors, cause the one or more processors to perform operations comprising:
receiving a first user identifier for a first user;
determining a first blockchain address of a first cryptography-based storage application for the first user based on the first user identifier;
generating a first non-transferable token corresponding to the first cryptography-based storage application by:
generating a non-fungible token comprising token metadata, the token metadata comprising (i) a first token identifier, (ii) the first user identifier, and (iii) the first blockchain address;
based on the first blockchain address, assigning the first user an owner of the non-fungible token;
generating a transfer function for transfer of the non-fungible token; and
modifying the transfer function to include a condition that generates an error code responsive to determining that a transfer of the non-fungible token from the first cryptography-based storage application has been requested;
receiving, from a second user, a request for a communication comprising communication metadata;
extracting, from the communication metadata, a target address and a target user identifier;
determining, based on the target address and the target user identifier, that the communication metadata matches the token metadata; and
based on the communication metadata matching the token metadata:
determining a validation status for the communication indicating the target address controls the first non-transferable token and is verified to receive the communication; and
responsive to determining, based on the validation status, that the communication was authorized, transmitting information related to the communication to the target address.

18. The one or more non-transitory, computer-readable media of claim 17, wherein the operations further comprise:
based on the validation status, generating, for display on a user interface, a dialog box that displays the validation status, and wherein the dialog box enables the second user to enter an input; and
receiving, through the dialog box, the input from the second user, wherein information related to the communication is transmitted to a blockchain node corresponding to the target address based on the input.

19. The one or more non-transitory, computer-readable media of claim 17, wherein generating the first non-transferable token comprises:
determining, for the first user, a first name and a first correspondence address;
storing the first name and the first correspondence address in a cloud-based storage location associated with a uniform resource identifier; and
storing the uniform resource identifier in the token metadata.

20. The one or more non-transitory, computer-readable media of claim 19, wherein determining the validation status for the communication comprises:
extracting a second name and a second correspondence address from the communication metadata; and
determining that (1) the first name matches the second name and (2) the first correspondence address matches the second correspondence address, wherein the validation status is determined based on (1) the first name matching the second name and (2) the first correspondence address matching the second correspondence address.

* * * * *